United States Patent [19]
Hutchins et al.

[11] Patent Number: 5,825,744
[45] Date of Patent: Oct. 20, 1998

[54] CONFIGURABLE READ DETECTION CHANNEL AND METHOD FOR DECODING DATA STORED WITHIN A DATA STORAGE MEDIUM

[75] Inventors: Robert Allen Hutchins; Glen Alan Jaquette; Alan Robert Clark, all of Tucson, Ariz.

[73] Assignee: International Business Machines Corporation, Armonk, N.Y.

[21] Appl. No.: 647,490

[22] Filed: May 13, 1996

[51] Int. Cl.[6] .................................................. G11B 7/00
[52] U.S. Cl. .............................. 369/124; 369/59; 360/46
[58] Field of Search ............................... 369/124, 59, 32, 369/47, 54, 58, 275.1, 275.2; 341/155, 118; 360/46, 53

[56] References Cited

U.S. PATENT DOCUMENTS

| | | | |
|---|---|---|---|
| 4,006,292 | 2/1977 | Schaefer | 369/109 |
| 4,821,253 | 4/1989 | Usui et al. | 369/54 |
| 4,949,196 | 8/1990 | Davie et al. | 360/40 |
| 5,121,369 | 6/1992 | Makansi | 369/13 |
| 5,293,369 | 3/1994 | Melas et al. | 369/59 |
| 5,298,901 | 3/1994 | Lekmine et al. | 341/155 |
| 5,315,284 | 5/1994 | Bentley et al. | 360/51 |
| 5,442,315 | 8/1995 | Hutchins | 327/159 |
| 5,502,711 | 3/1996 | Clark et al. | 369/44.34 |
| 5,508,855 | 4/1996 | Hutchins et al. | 360/46 |
| 5,530,601 | 6/1996 | Hutchines et al. | 360/46 |

FOREIGN PATENT DOCUMENTS

| | | |
|---|---|---|
| 1-155522 | 6/1989 | Japan . |
| 3-116442 | 5/1991 | Japan . |
| 4-205721 | 7/1992 | Japan . |

OTHER PUBLICATIONS

Fennema et al., "On–Track Focus Offset Calibration," IBM Technical Disclosure Bulletin, vol. 32, No. 12, May 1990, pp. 334–345.

*Primary Examiner*—Tod R. Swann
*Assistant Examiner*—Kim-Kwok Chu
*Attorney, Agent, or Firm*—Daniel A. Shifrin; Brian F. Russell; Andrew J. Dillon

[57] ABSTRACT

In a first embodiment, a read detection channel includes a tracking threshold circuit for generating a variable threshold signal and a detection circuit, which is configurable in a number of diverse configurations that each correspond to one of the multiple diverse data formats. In addition, the first embodiment of the read detection channel includes a configuration circuit that automatically selects one of the configurations of the data detection circuit in response to a detection of a format of the input data stream. The first embodiment of the read detection channel permits data bits encoded in multiple diverse data formats to be decoded utilizing a single configurable read detection channel. In a second embodiment, the configurable read detection channel includes a tracking threshold circuit that can be configured to generate a threshold output signal in response to an input signal or in response to the input signal and a phase error signal. The second embodiment of the read detection channel further includes a detection circuit, which indicates data bits detected within the input signal in response to the threshold output signal, and at least one phase-locked loop coupled to the detection circuit, which places each detected data bit within one of a plurality of bit cells within an output data stream. The phase-locked loop also generates a phase error signal that can be selectively coupled to the tracking threshold circuit.

31 Claims, 4 Drawing Sheets

CONFIGURABLE READ DETECTION CHANNEL AND METHOD FOR DECODING DATA STORED WITHIN A DATA STORAGE MEDIUM

CROSS REFERENCE TO RELATED APPLICATIONS

U.S. patent application Ser. No. 08/073,921, now U.S. Pat. No. 5,315,284, entitled "Asynchronous Digital Threshold Detector for Digital Data Storage Channel," filed Jun. 7, 1993, is incorporated herein by reference.

U.S. patent application Ser. No. 08/407,124, now U.S. Pat. No. 5,502,711, entitled "Dual Digital Phase Locked Loop Clock Channel for Optical Recording," filed Mar. 20, 1995, is incorporated herein by reference.

U.S. patent application Ser. No. 08/418,691, now U.S. Pat. No. 5,508,855, entitled "Tracking Threshold Circuit for Peak Detection," filed Apr. 7, 1995, is incorporated herein by reference.

BACKGROUND OF THE INVENTION

1. Technical Field

The present invention relates in general to a method and system for data processing and in particular to a read detection channel and method for decoding data stored in a data storage medium. Still more particularly, the present invention relates to a configurable read detection channel and method for decoding data stored in a data storage medium utilizing one of multiple diverse encoding methods.

2. Description of the Related Art

Data storage media such as optical disks, magnetic disks (i.e., diskettes or hard disks), magnetic tape, and optical tape are widely utilized to provide inexpensive and reliable data storage. Within a data storage medium, data can be stored in one or more of a number of write encodings, which are selected depending upon the type of data storage medium and data density. For example, data stored on an optical disk can be encoded utilizing either peak-position modulation (PPM) or pulse-width modulation (PWM).

PPM data recording comprises a well known recording method in which the presence of a peak in a data waveform is interpreted as a selected one of a binary 1 or binary 0. In general, peaks within an input data waveform are detected during time intervals at which the derivative of the data waveform has a value of zero and the amplitude of the data waveform exceeds a predetermined threshold value. PPM data recording was widely utilized in the previous generation of optical recording media, including both single-density (1X) and double-density (2X) optical disks.

In contrast to PPM data recording, PWM data recording is a data recording method in which the presence of a signal transition in a bit cell time interval indicates a selected one of a binary 1 or a binary 0 and the absence of a signal transition in a bit cell time interval indicates the other of the two possible binary states. Because both the presence and absence of a signal transition in a bit cell time interval carries data information, PWM (as well as PPM) data recording requires that a detection clock be provided to accurately define the bit cell time intervals. This detection clock signal must be synchronized with the bit cell time interval utilized when the PWM-encoded data was originally written on the optical media in order to accurately reproduce the original data. PWM data recording is utilized in the current generation of optical recording media, including 4X optical disks.

In order to support multiple diverse data recording formats (e.g., PPM and PWM), some data recovery devices, such as optical disk drives, include multiple read detection channels, which are each adapted to decode data stored within a data storage medium in a particular data format. Data recovery devices having multiple distinct read detection channels suffer a number of drawbacks. First, because the data recovery devices include a separate read detection channel to support each of the multiple diverse data encoding methods, the data recovery devices are large, expensive, and consume a large amount of power. In addition, the data recovery devices are unable to adapt to support future encoding methods or data density increases because the analog circuitry conventionally utilized to implement each of the multiple read detection channels is suitable only for the detection of data encoded utilizing a particular encoding method.

As should thus be apparent, a read detection channel for a data recovery device is needed that is configurable to read data stored utilizing multiple diverse encoding methods. In particular, it would be advantageous to provide a fully digital modular read detection channel that is configurable to support multiple diverse channel architectures and that shares circuit functions between multiple configurations in order to minimize silicon usage and read channel power consumption.

SUMMARY OF THE INVENTION

It is therefore one object of the present invention to provide a method and system for data processing.

It is another object of the present invention to provide an improved read detection channel and method for decoding data stored in a data storage medium.

It is yet another object of the present invention to provide a configurable read detection channel and method for decoding data stored in a data storage medium utilizing one of multiple diverse encoding methods.

The foregoing objects are achieved as is now described. In a first embodiment, a read detection channel includes a tracking threshold circuit for generating a variable threshold signal and a detection circuit, which is configurable in a number of diverse configurations that each correspond to one of the multiple diverse data formats. In addition, the first embodiment of the read detection channel includes a configuration circuit that automatically selects one of the configurations of the data detection circuit in response to a detection of a format of the input data stream. The first embodiment of the read detection channel permits data bits encoded in multiple diverse data formats to be decoded utilizing a single configurable read detection channel. In a second embodiment, the configurable read detection channel includes a tracking threshold circuit that can be configured to generate a threshold output signal in response to an input signal or in response to the input signal and a phase error signal. The second embodiment of the read detection channel further includes a detection circuit, which indicates data bits detected within the input signal in response to the threshold output signal, and at least one phase-locked loop coupled to the detection circuit, which places each detected data bit within one of a plurality of bit cells within an output data stream. The phase-locked loop also generates a phase error signal that can be selectively coupled to the tracking threshold circuit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
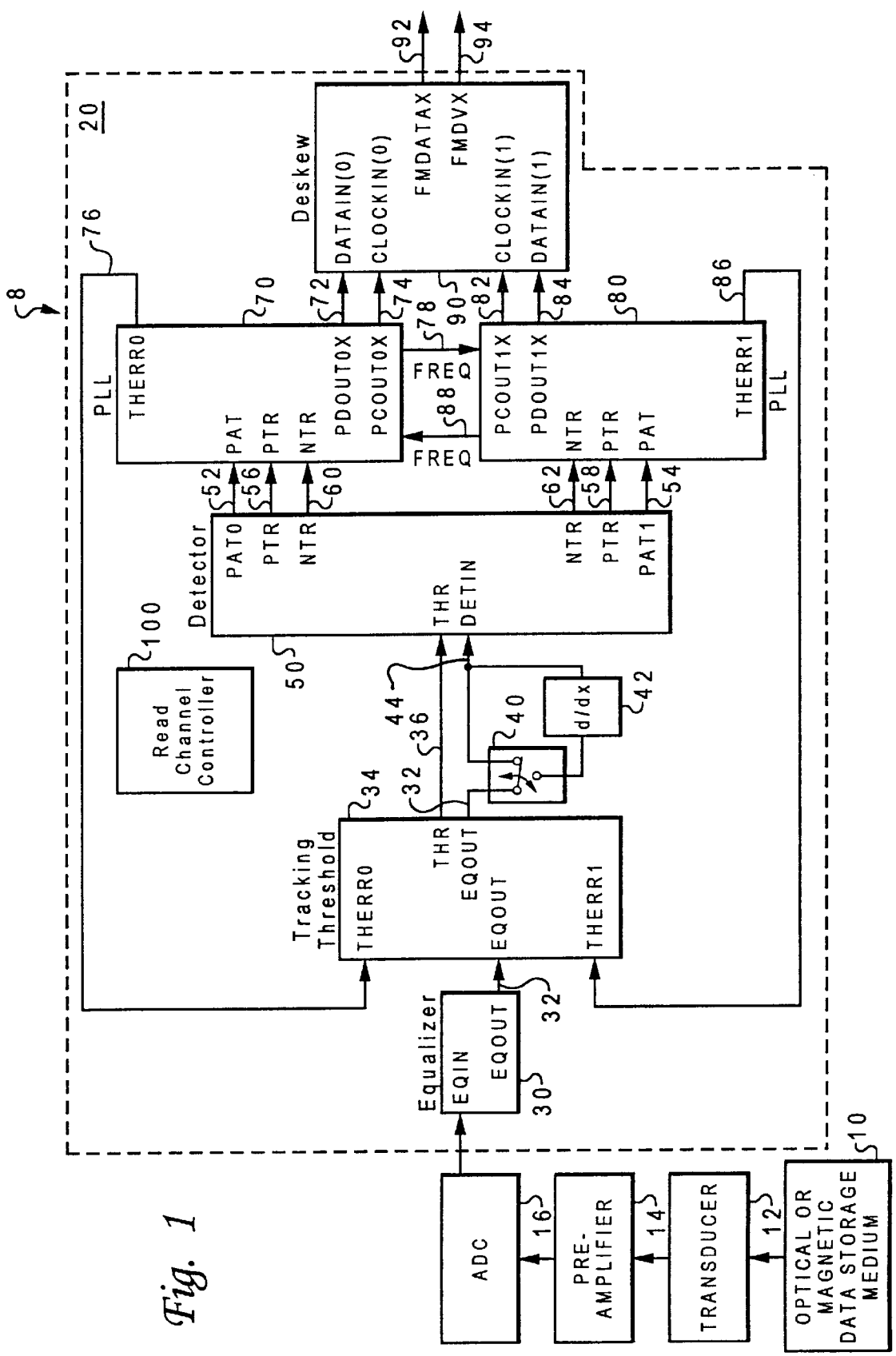
FIG. 1 illustrates a block diagram representation of a configurable read detection channel in accordance with the present invention, wherein the configurable read detection channel is configured as a dual phase adaptive threshold (DPAT) PWM read detection channel.

With reference now to the figures and in particular with reference to FIG. 1, there is illustrated a block diagram representation of a configurable read detection channel in accordance with the present invention. Read detection channel 20 is preferably implemented utilizing fully digital modular circuitry that can be configured into multiple diverse configurations, including those illustrated in FIGS. 1–4. The configurability of read detection channel 20 permits the recovery of data stored utilizing multiple diverse encoding methods as well as the selective use of multiple diverse read detection channel architectures.

Referring again to FIG. 1, the illustrated configuration of read detection channel 20 is a dual phase adaptive threshold (DPAT) channel for decoding PWM signals, which utilizes phase feedback from dual phase-locked loops (PLLs) to maintain a reference threshold level near the optimum detection level for the input PWM signal. The DPAT architecture advantageously effects a reduction in the sensitivity of read detection channel 20 to thermal blooming (i.e., the systematic lengthening of recorded marks in the data storage medium relative to gap length) and tracking threshold variation, both common sources of read errors in conventional PWM read detection channels. As depicted, read detection channel 20 comprises a portion of a data recovery device 8 for reading data stored within an optical or magnetic data storage medium 10. Data storage medium 10 can include, but is not limited to optical or magnetic tape or an optical or magnetic disk. Magnetic or optical transitions in data storage medium 10 are sensed by transducer 12 utilizing any useful technique known in the art. For example, if data storage medium 10 comprises an optical disk, a conventional differential laser detector can be employed for transducer 12. Alternatively, if data storage medium 10 is a magnetic medium, transducer 12 can comprise a conventional magnetic read (MR) head. The output signal of transducer 12 is then amplified by pre-amplifier 14 and passed to analog-to-digital converter (ADC) 16. ADC 16 converts the analog input signal into a digital waveform representation utilizing any useful manner known in the art. The digital waveform representation output of ADC 16 forms the input data stream of read detection channel 20.

The embodiment of read detection channel 20 illustrated in FIG. 1 includes equalizer 30, tracking threshold circuit 34, digital switch 40, differentiator 42, detector 50, dual phase-locked loops (PLLs) 70 and 80, and deskew (merging) circuit 90, which are each connected by unillustrated control signals to read channel controller 100. The digital waveform output of ADC 16 that forms the input data stream of read detection channel 20 is received by equalizer 30. Equalizer 30 filters the input data stream utilizing a finite impulse response (FIR) digital filter, for example. The filtered digital waveform representation is then passed to tracking threshold circuit 34 as equalizer output (EQOUT) signal 32.

Tracking threshold circuit 34 is a configurable circuit that generates a threshold (THR) signal 36 utilized by detector 50 to detect data transitions within the input data stream. In a preferred embodiment of the present invention, THR signal 36 is an estimate of an optimum detection level that is substantially near a mid-point between the positive and negative peaks of EQOUT signal 32. Utilizing THR signal 36 generated by tracking threshold circuit 34, detector 50 can identify transitions of the input data stream through zero and accordingly detect data bits encoded within data storage medium 10. The centerline threshold estimation performed by tracking threshold circuit 34 can be accomplished utilizing any of the threshold estimation techniques known in the art. For example, in a first configuration, tracking threshold circuit 34 can estimate the centerline threshold simply by computing a weighted average of time samples of EQOUT signal 32. An exemplary tracking threshold circuit that computes a threshold estimate from a weighted average of input signal time samples is described in U.S. patent application Ser. No. 08/418,691, now U.S. Pat. No. 5,508,855, entitled "Tracking Threshold Circuit for Peak Detection," filed Apr. 7, 1995, which is incorporated herein by reference. Alternatively, as depicted in FIG. 1, tracking threshold circuit 34 can be configured in a second configuration that estimates the threshold centerline of the input data stream based upon both EQOUT signal 32 and threshold error (THERR) signals 76 and 86, which specify a phase difference between EQOUT signal 32 and data output signals 72 and 84, respectively.

As depicted in FIG. 1, THR signal 36 and EQOUT signal 32, the ouputs of tracking threshold circuit 34, are connected to a data detection circuit comprising digital switch 40, differentiator 42, and detector 50. EQOUT signal 32 is received as an input into digital switch 40, which is controlled by read channel controller 100. As illustrated in FIG. 1, when read detection channel 20 is configured to decode PWM-encoded data, digital switch 40 is configured such that EQOUT signal 32 is directly connected to detector input (DETIN) 44. Alternatively, when read detection channel 20 is configured to decode data encoded in PPM format, digital switch 40 connects EQOUT signal 32 to differentiator 42, which differentiates EQOUT signal 32 to map peaks in EQOUT signal 32 to zero-crossings. The differentiated waveform output of differentiator 42 is connected to detector input (DETIN) 44.

Detector 50 utilizes THR signal 36 to estimate the location of a transition or zero-crossing within the signal received at detector input 44. At a given sample time, if the data sample at detector input 44 has a value greater than the value of THR signal 36 and the previous data sample has a value less than that of THR signal 36, or conversely, if the data sample at detector input 44 has a value less than that of THR signal 36 and the previous data sample has a value greater than that of THR signal 36, detector 50 indicates that a zero-crossing has occurred by generating an estimation of where within the sample cell the transition occurred. In addition, detector 50 generates a qualifier indicating whether the transition is a rising or falling edge of a pulse. Although any useful digital zero-crossing detector can be utilized for detector 50, a particularly suitable digital threshold transition detector is described by Bentley et al. in U.S. Pat. No. 5,315,284, entitled "Asynchronous Digital Threshold Detector for a Digital Data Storage Channel," which is incorporated herein by reference.

In the embodiment of detector 50 described by Bentley et al., detector 50 follows three steps to estimate the zero-crossing arrival time within a signal sampling interval. First, detector 50 determines if a zero-crossing has occurred by examining adjacent data sample pairs for changes in sign with respect to THR signal 36. Second, in response to a detection of a zero-crossing, the sample rate is converted from a higher sampling rate to a lower sampling rate that is one half of the higher sampling rate in order to determine which half of the new longer sample period contains the transition through the threshold centerline. Finally, detector 50 determines a proportional location of the transition within the shorter sampling period utilizing linear interpolation. The estimate of where within the sample cell the transition occurred is provided to dual PLLs 70 and 80 as pulse arrival time (PAT) signals 52 and 58. As noted above, detector 50 further supplies PLLs 70 and 80 with qualifiers indicating whether a transition comprises the rising or falling edge of a pulse by asserting either positive transition (PTR) signals 56 and 58 or negative transition (NTR) signals 60 and 62, respectively.

Still referring to FIG. 1, dual digital PLLs 70 and 80 are each connected to PAT, PTR, and NTR output signals of detector 50. In the depicted dual phase adaptive threshold (DPAT) configuration of read detection channel 20, PLL 70 is designated to process positive transitions and PLL 80 is designated to process negative transitions. Thus, in response to the receipt of PAT signal 52 and PTR signal 56, PLL 70 places a data bit of a selected polarity within a particular bit cell among the plurality of bit cells within data output (PDOUT0X) signal 72. Similarly, PLL 80 places a data bit of the selected polarity within a bit cell in data output (PDOUT1X) signal 84 in response to the receipt of PAT signal 54 and the assertion of NTR signal 62. Data output signals 72 and 84 are associated with clock output signals 74 and 82, respectively, which provide a data valid signal for every bit cell in data output signals 72 and 84. The outputs of PLLs 70 and 80 further include threshold error (THERR) signals 76 and 86, which comprise phase error signals that are utilized by tracking threshold circuit 34 to lock onto the correct centerline threshold value. In addition, PLLs 70 and 80 generate frequency signals 78 and 88, which are each coupled to the frequency adjustment portion of the loop filter within the other one of PLLs 70 and 80. Frequency signals 78 and 88 communicate phase error information that enables dual PLLs 70 and 80 to operate at a substantially identical frequency, while permitting individual phase adjustment. Further details concerning the operation of read detection channel 20 in a DPAT architecture are disclosed by Clark et al. in U.S. Pat. No. 5,502,711 entitled "Dual Digital Phase Locked Loop Clock Channel for Optical Recording," which is incorporated herein by reference.

Next, read detection channel 20 includes digital deskew logic 90, which is connected to receive data output signals 72 and 84 and clock output signals 74 and 82 from PLLs 70 and 80, respectively. Deskew logic 90 merges data output signals 72 and 84 and clock output signals 74 and 82 to obtain output data stream (FMDATAX) 92 and data valid signal (FMDVX) signal 94. Output data stream 92 and data valid signal 94 are sent to a well-known signal formatter (not illustrated), which strips non-data information such as sector information, burst fields, and synch characters from output data stream 92 in order to recover the original data stored within data storage medium 10.

Finally, read detection channel 20 includes read channel controller 100, which configures each of the components of read detection channel 20 in accordance with a selected read channel architecture. Read channel controller 100 can be implemented as a local microprocessor that configures read detection channel 20 in response to the detection of a particular method utilized to encode data within data storage medium 10. For example, a conventional optical disk includes an encoded region (i.e., a PEP channel) adjacent to the hub that specifies the encoding method utilized to record data on the optical disk. When an optical disk such as data storage medium 10 is loaded into data recovery device 8, read channel controller 100 detects the presence of data storage medium 10 and engages a servomechanism to position transducer 12 to read the PEP channel of data storage medium 10. The fields in the PEP channel are then read out utilizing read detection channel 20 and stored in the registers of read channel controller 100. Utilizing the PEP field information, read channel controller 100 configures read detection channel 20 as required to decode the data stored within data storage medium 10.

Read channel controller 100 can also be advantageously programmed to reconfigure read detection channel 20 in response to the detection of various error conditions. For example, upon detecting an uncorrectable read error, many conventional read channel controllers attempt to recover the corrupted data simply rereading a portion of the data storage medium. After a predetermined number of retrys, the conventional read channel controller typically issues an interrupt to the associated data processing system reporting a defective or unreadable data storage medium. In contrast to such conventional systems, read channel controller 100 can be programmed to alter the configuration of read detection channel 20 or to vary the parameters of PLLs 70 and 80 or other read detection channel components as part of its error recovery procedure (ERP).

Figure 2:
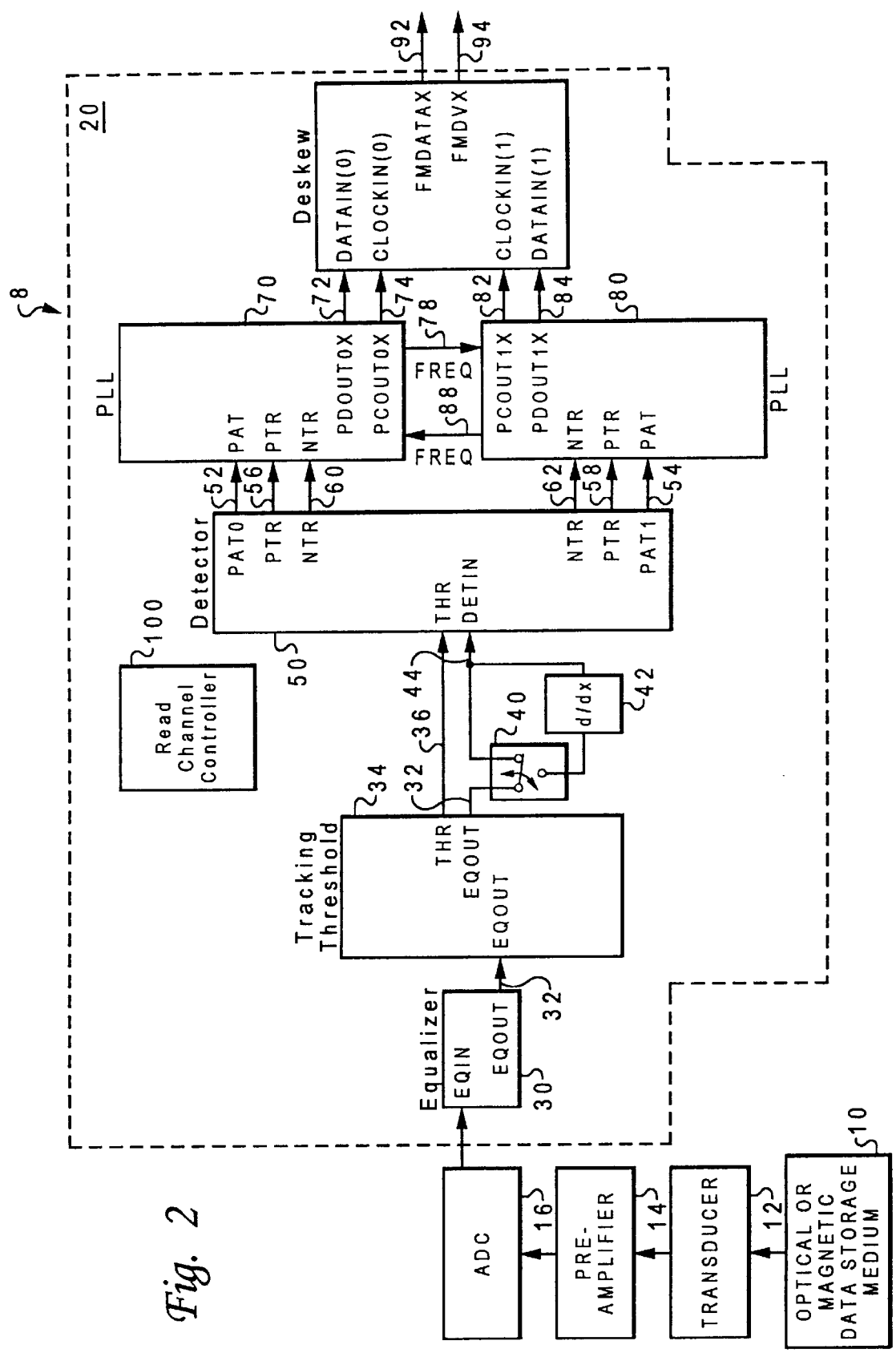
FIG. 2 depicts a second block diagram representation of a configurable read detection channel in accordance with the present invention, wherein the read detection channel is configured as a dual phase-locked loop PWM read detection channel without phase feedback.

Referring now to FIG. 2, there is depicted a second configuration of read detection channel 20 in which read detection channel 20 is configured to operate with dual PLLs, but without threshold error feedback. In the illustrated read detection channel architecture, the threshold centerline estimate developed by tracking threshold circuit 34 is based solely upon EQOUT signal 32. Thus, dual PLLs 70 and 80 must compensate for any variations in the threshold centerline estimate. Read detection channel 20 can be configured as illustrated in FIG. 2 in response to the detection of a particular type or predetermined number of errors occurring during data recovery utilizing the configuration of read detection channel 20 depicted in FIG. 1. For example, read channel controller 100 can reconfigure tracking threshold circuit 34 and switch out threshold error signals 76 and 86 in response to a determination during the execution of an ERP that the centerline threshold provided by tracking threshold circuit 34 is insufficiently stable or that the delay inherent in threshold error signals 76 and 86 is a source of error.

Figure 3:
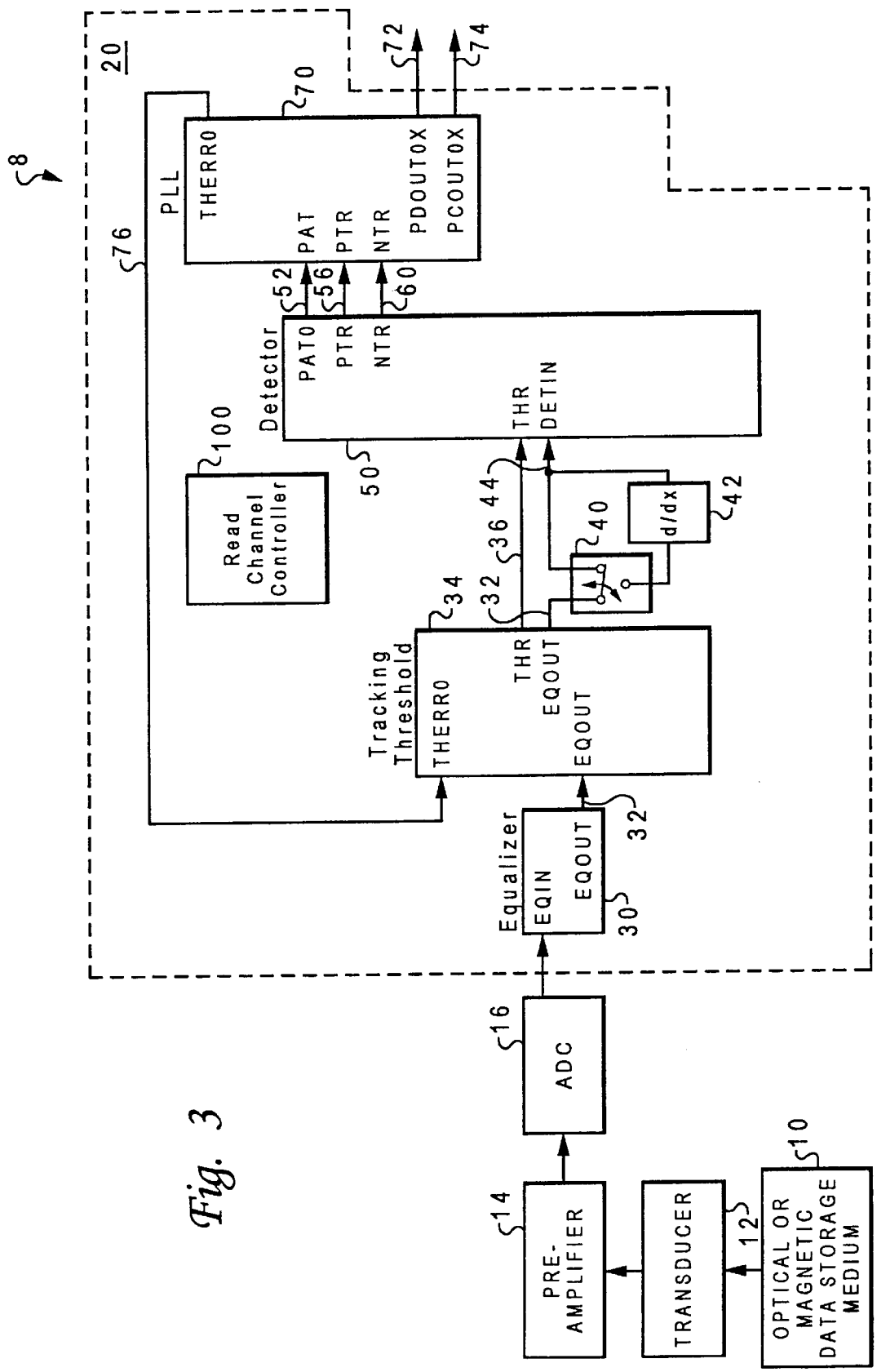
FIG. 3 illustrates a third block diagram representation of a configurable read detection channel in accordance the present invention, wherein the read detection channel is configured as a single phase-locked loop PWM read detection channel with phase feedback.

With reference now to FIG. 3, there is illustrated a third configuration of read detection channel 20 utilized for decoding data encoded in PWM format. The third configuration depicted in FIG. 3 is similar to the configuration illustrated in FIG. 1, with the exception that only a single PLL is utilized to place detected data bits within bit cells in an output data stream. Accordingly, PLL 70 processes both positive and negative transitions detected by detector 50. From the foregoing description, those skilled in the art will appreciate that read detection channel 20 can be configured as shown in FIG. 3 simply by switching out PLL 80 and configuring PLL 70 to process both positive and negative transitions.

Figure 4:
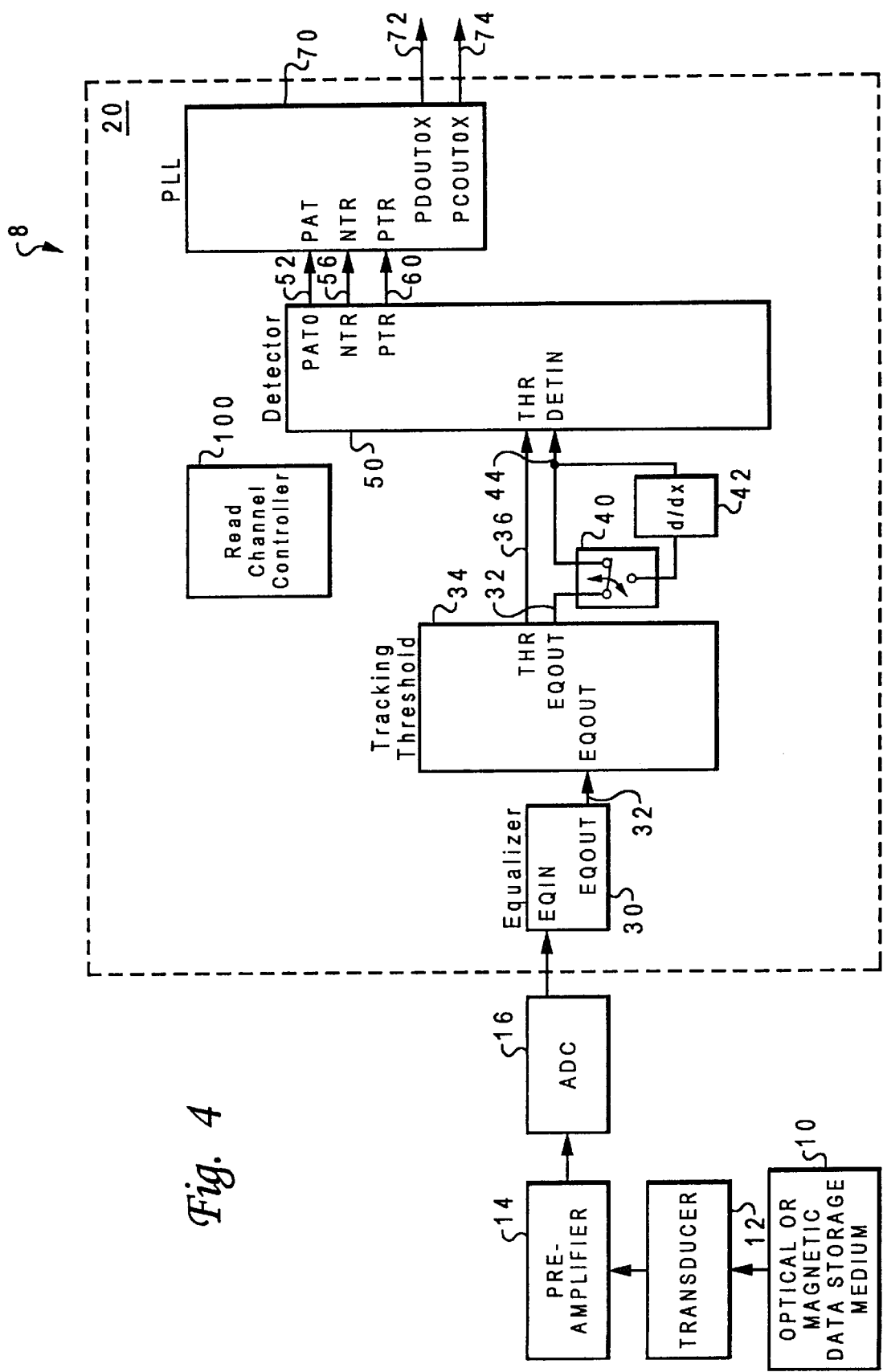
FIG. 4 depicts a fourth block diagram representation of a configurable read detection channel in accordance with the present invention, wherein the read detection channel is configured as a PPM read detection channel.

Referring now to FIG. 4, there is depicted a fourth configuration of read detection channel 20 in which read detection channel 20 is configured to decode PPM-encoded data. As illustrated, the read channel input data stream is received and filtered by equalizer 30. The filtered input data stream is passed to tracking threshold circuit 34, which computes a threshold centerline estimate by taking a weighted average of time samples of EQOUT signal 32. As in the previously described configurations of read detection channel 20, tracking threshold circuit 34 supplies the threshold centerline estimate to detector 50 via THR signal 36 and passes EQOUT signal 32 to digital switch 40. However, in contrast to the previously described PWM configurations of read detection channel 20, digital switch 40 connects EQOUT signal 32 to differentiator 42, which provides a differentiated digital waveform representation to detector input 44 in which peaks within the input data stream are mapped to zero-crossings. As described above with respect to the PWM channel configuration shown FIG. 1, detector 50 then utilizes threshold signal 36 to detect data bits within detector input 44. In response to the detection of each data bit, detector 50 sends a PAT signal 52 to PLL 70 qualified by either a PTR signal 60 or NTR signal 56. Thereafter, PLL 70 places the detected data bit within a bits cell in data output signal 72 in a manner which has been described.

As has been described, the present invention provides a configurable read detection channel that can be configured in a number of diverse configurations to permit data stored utilizing multiple diverse encoding methods to be decoded utilizing a single configurable read detection channel. Although the present invention has been described with reference to a preferred embodiment of a configurable read detection channel that can be selectively configured to decode either PWM or PPM-encoded data, the present invention is also applicable to other current and future data encodings. The present invention further provides a configurable read detection channel that can be configured in multiple architectures suitable for decoding data stored utilizing a particular encoding method. The present invention can be advantageously implemented as a programmable integrated circuit device that provides a generic read detection channel for use in diverse types of data recovery devices.

While the invention has been particularly shown and described with reference to a preferred embodiment, it will be understood by those skilled in the art that various changes in form and detail may be made therein without departing from the spirit and scope of the invention.

What is claimed is:

1. A configurable read detection channel for decoding an input data stream containing data bits encoded in one of a plurality of diverse data formats, said configurable read detection channel comprising:
   a tracking threshold circuit for generating a variable threshold signal in response to an amplitude parameter of said input data stream;
   a configurable data detection circuit, wherein said configurable data detection circuit has a plurality of diverse configurations that each correspond to one of said plurality of diverse data formats, wherein said configurable data detection circuit identifies data bits within said input data stream in response to said variable threshold signal; and
   automatic configuration means for selecting a particular one of said plurality of diverse configurations of said configurable data detection circuit in response to a detection of a data format of said input data stream, wherein data bits encoded in a plurality of diverse data formats can be decoded utilizing a single configurable read detection channel.

2. The configurable read detection channel of claim 1, wherein said tracking threshold circuit and said configurable data detection circuit comprise digital circuitry.

3. The configurable read detection channel of claim 1, and further comprising:
   at least one phase-locked loop coupled to said configurable data detection circuit, wherein said at least one phase-locked loop generates an output data stream including a plurality of bit cells, and wherein said at least one phase-locked loop places each detected data bit indicated by said configurable data detection circuit within one of said plurality of bits cells within said output data stream.

4. The configurable read detection channel of claim 3, and further comprising a feedback loop coupled between said at least one phase-locked loop and said tracking threshold circuit, wherein said feedback loop provides a phase error signal utilized to compute said threshold signal to said tracking threshold circuit.

5. The configurable read detection channel of claim 3, wherein said at least one phase-locked loop comprises dual phase-locked loops.

6. The configurable read detection channel of claim 5, and further including a merging circuit that merges an output data stream of each of said dual phase-locked loops into a single output data stream.

7. The configurable read detection channel of claim 5, wherein at least one of said dual phase-locked loops is selectively connectable to said configurable data detection circuit.

8. The configurable read detection channel of claim 1, wherein said plurality of data formats include pulse-width modulation (PWM) and peak-position modulation (PPM).

9. The configurable read detection channel of claim 1, and further comprising an input filter coupled to said input data stream that provides a filtered input data stream to said tracking threshold circuit.

10. The configurable read detection channel of claim 1, wherein multiple configurations among said plurality of configurations of said configurable read detection circuit correspond to a single one of said plurality of data formats.

11. A data recovery apparatus for reading data stored within a data storage medium, comprising:
   a transducer for sensing data stored within a data storage medium, wherein said transducer produces an input signal containing data bits encoded in one of a plurality of data formats;
   a configurable read detection channel, including:
       a tracking threshold circuit for generating a variable threshold signal in response to an amplitude parameter of said input signal;
       a configurable data detection circuit, wherein said configurable data detection circuit has a plurality of diverse configurations that each correspond to one of said plurality of diverse data formats, wherein said configurable data detection circuit identifies data bits within said input signal in response to said variable threshold signal; and automatic configuration means for selecting a particular one of said plurality of diverse configurations of said configurable data detection circuit in response to a detection of a data format of said input signal, wherein data bits encoded in a plurality of diverse data formats can be decoded utilizing a single configurable read detection channel.

12. The data recovery apparatus of claim 11, wherein said tracking threshold circuit and said configurable data detection circuit comprise digital circuitry.

13. The data recovery apparatus of claim 12, and further comprising an analog-to-digital converter coupled between said transducer and said configurable read detection channel, wherein said analog-to-digital converter converts said input signal from an analog format to a digital format.

14. The data recovery apparatus of claim 11, and further comprising:
at least one phase-locked loop coupled to said configurable data detection circuit, wherein said at least one phase-locked loop generates an output data stream including a plurality of bit cells, and wherein said at least one phase-locked loop places each detected data bit indicated by said configurable data detection circuit within one of said plurality of bits cells within said output data stream.

15. The data recovery apparatus of claim 14, wherein said at least one phase-locked loop comprises dual phase-locked loops.

16. The data recovery apparatus of claim 15, wherein at least one of said dual phase-locked loops is selectively connectable to said configurable data detection circuit.

17. The data recovery apparatus of claim 15, said configurable read detection channel further including a merging circuit that merges an output data stream of each of said dual phase-locked loops into a single output data stream.

18. The data recovery apparatus of claim 11, and further comprising a feedback loop coupled between said at least one phase-locked loop and said tracking threshold circuit, wherein said feedback loop provides a phase error signal utilized to compute said threshold signal to said tracking threshold circuit.

19. The data recovery apparatus of claim 11, wherein said plurality of data formats include pulse-width modulation (PWM) and peak-position modulation (PPM).

20. The data recovery apparatus of claim 11, and further comprising an input filter coupled to said input data stream that provides a filtered input data stream to said tracking threshold circuit.

21. The data recovery apparatus of claim 11, wherein multiple configurations among said plurality of configurations of said configurable data detection circuit correspond to a single one of said plurality of data formats.

22. The data recovery apparatus of claim 11, wherein said data storage medium comprises a magnetic medium.

23. The data recovery apparatus of claim 11, wherein said data storage medium comprises an optical medium.

24. A configurable read detection channel for decoding an input data stream containing encoded data bits, said configurable read detection channel comprising:
a configurable tracking threshold circuit for generating a variable threshold signal, said configurable tracking threshold circuit having a plurality of diverse configurations, wherein said plurality of diverse configurations includes a first configuration in which said variable threshold signal is generated in response to an amplitude parameter of said input data stream and a second configuration in which said configurable tracking threshold circuit generates said variable threshold signal in response to an amplitude parameter of said input data stream and a phase error signal;
automatic configuration means for selecting a particular one of said plurality of diverse configurations of said configurable tracking threshold circuit;
a data detection circuit for detecting data bits encoded within said input data stream in response to said variable threshold signal; and
at least one phase-locked loop coupled to said detection output, said at least one phase-locked loop having an output data stream comprising a plurality of bit cells, wherein said at least one phase-locked loop places each data bit detected by said data detection circuit in one of said plurality of bit cells within said output data stream, and wherein said at least one phase-locked loop generates a phase error signal that is selectively coupled to said configurable tracking threshold circuit in response to a selection of a particular configuration of said configurable tracking threshold means by said automatic configuration means.

25. The configurable read detection channel of claim 24, wherein said at least one phase-locked loop comprises dual phase-locked loops.

26. The configurable read detection channel of claim 25, and further comprising a merging circuit that merges an output data stream of each of said dual phase-locked loops into a single output data stream.

27. The configurable read detection channel of claim 25, wherein at least one of said dual phase-locked loops is selectively connectable to said data detection circuit.

28. The configurable read detection channel of claim 27, and further comprising an input filter coupled to said input data stream that provides a filtered input data stream to said configurable tracking threshold circuit.

29. A data recovery apparatus for reading data stored in a data storage medium, comprising:
a transducer for sensing data stored in a data storage medium, wherein said transducer produces an input signal containing encoded data bits;
a configurable read detection channel, including:
a configurable tracking threshold circuit for generating a variable threshold signal, said configurable tracking threshold circuit having a plurality of diverse configurations, wherein said plurality of diverse configurations includes a first configuration in which said variable threshold signal is generated in response to an amplitude parameter of said input data stream and a second configuration in which said configurable tracking threshold circuit generates said variable threshold signal in response to an amplitude parameter of said input data stream and a phase error signal;
automatic configuration means for selecting a particular one of said plurality of diverse configurations of said configurable tracking threshold circuit;
a data detection circuit for detecting data bits encoded within said input data stream in response to said variable threshold signal; and
at least one phase-locked loop coupled to said detection output, said at least one phase-locked loop having an output data stream comprising a plurality of bit cells, wherein said at least one phase-locked loop places each data bit detected by said data detection circuit in one of said plurality of bit cells within said output data stream, and wherein said at least one phase-locked loop generates a phase error signal that is selectively coupled to said configurable tracking threshold circuit in response to a selection of a particular configuration of said configurable tracking threshold means by said automatic configuration means.

30. A method within a data recovery device for decoding an input data stream containing data bits encoded in one of a plurality of diverse data formats, said data recovery device including a configurable data detection circuit having a plurality of configurations that each correspond to one of said plurality of diverse data formats, said method comprising:

detecting a particular data format among said plurality of data formats utilized to encode data within said input data stream;

in response to said detection, automatically configuring said configurable data detection circuit in a selected one of said plurality of configurations corresponding to said particular format;

generating a variable threshold signal in response to an amplitude parameter of said input data stream;

identifying data bits within said input data stream in response to said variable threshold signal utilizing said configurable data detection circuit, wherein data bits encoded in a plurality of diverse data formats can be decoded.

31. A method within a data recovery device for decoding an input data stream containing data bits encoded in one of a plurality of diverse data formats, said data recovery device including a configurable tracking threshold circuit having a plurality of diverse configurations, said method comprising:

automatically configuring said configurable tracking threshold circuit in a selected configuration among said plurality of diverse configurations, wherein said plurality of diverse configurations includes a first configuration in which said configurable tracking threshold circuit generates a variable threshold signal in response to an amplitude parameter of said input data stream and a second configuration in which said configurable tracking threshold circuit generates said variable threshold signal in response to an amplitude parameter of said input data stream and a phase error signal;

in response to selection of said second configuration, coupling said phase error signal to said configurable tracking threshold circuit;

generating said variable threshold signal in accordance with said selected configuration utilizing said configurable tracking threshold circuit;

detecting data bits encoded within said input data stream in response to said variable threshold signal; and in response to a detection of a data bit, placing said detected data bit in one of a plurality of bit cells within an output data stream; and generating a phase error signal in response to a phase difference between said input data stream and said output data stream, wherein said phase error signal is selectively coupled to said configurable tracking threshold circuit.

* * * * *